(12) United States Patent
Fan et al.

(10) Patent No.: US 12,324,082 B2
(45) Date of Patent: Jun. 3, 2025

(54) COMBINATION MICROWAVE AND HOOD SYSTEM

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Wenjie Fan, Foshan (CN); Yuliang Dang, Foshan (CN); Shiyong Liu, Foshan (CN); Zhifei Huang, Foshan (CN); Mengluan Li, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 471 days.

(21) Appl. No.: 17/477,445

(22) Filed: Sep. 16, 2021

(65) Prior Publication Data
US 2022/0279631 A1   Sep. 1, 2022

(30) Foreign Application Priority Data

Mar. 1, 2021  (CN) .......................... 202110224537.6
Mar. 1, 2021  (CN) .......................... 202110225393.6

(51) Int. Cl.
*H05B 6/64* (2006.01)
*A47J 36/38* (2006.01)
(Continued)

(52) U.S. Cl.
CPC ............ *H05B 6/6423* (2013.01); *A47J 36/38* (2013.01); *A47J 37/0629* (2013.01); *F24C 15/2007* (2013.01)

(58) Field of Classification Search
CPC ..... H05B 6/6423; A47J 36/38; A47J 37/0629; F24C 15/2007; F24C 15/20
See application file for complete search history.

(56) References Cited

U.S. PATENT DOCUMENTS 4,327,274 A * 4/1982 White .................. H05B 6/6429
                                                  219/400
10,149,352 B2 * 12/2018 Huang ................ H05B 6/6423
(Continued)

FOREIGN PATENT DOCUMENTS

CA    2674935 A1    7/2008
CN    1573217 A     2/2005
(Continued)

OTHER PUBLICATIONS

First OA received in CN Application No. 202110224537.6; mailed Aug. 31, 2023.

*Primary Examiner* — Helena Kosanovic
*Assistant Examiner* — Thao Uyen Tran-Le
(74) *Attorney, Agent, or Firm* — K&L Gates LLP

(57) ABSTRACT

The present application discloses a cooking device, which includes an inner chamber, an outer cover and an air suction assembly; the inner chamber is provided with a cooking cavity; the outer cover is arranged outside the inner chamber, and a heat dissipation air duct and a fume air duct is formed between the outer cover and the inner chamber; at least part of the heat dissipation air duct is located on a side of the inner chamber, a first air inlet of the heat dissipation air duct is provided on the outer cover and arranged corresponding to the side of the inner chamber, the heat dissipation air duct communicates with the cooking cavity and the fume air duct respectively, and a set of power devices of the cooking device are placed in the heat dissipation air duct.

11 Claims, 5 Drawing Sheets

(51) Int. Cl.
    *A47J 37/06*     (2006.01)
    *F24C 15/20*     (2006.01)

(56) References Cited

U.S. PATENT DOCUMENTS

| | | | | |
|---|---|---|---|---|
| 2006/0011622 A1* | 1/2006 | Lundstrom | .......... | H05B 6/6402 |
| | | | | 219/757 |
| 2016/0119982 A1* | 4/2016 | Kang | .................. | H05B 6/6423 |
| | | | | 219/757 |
| 2016/0381741 A1* | 12/2016 | Lee | .................... | F24C 15/2035 |
| | | | | 219/757 |

FOREIGN PATENT DOCUMENTS

| CN | 1626893 | A | | 6/2005 |
|---|---|---|---|---|
| CN | 1712779 | A | | 12/2005 |
| CN | 101294720 | A | | 10/2008 |
| CN | 203454227 | U | | 2/2014 |
| CN | 205447882 | U | | 8/2016 |
| CN | 107044666 | A | | 8/2017 |
| CN | 206626630 | U | | 11/2017 |
| CN | 208983445 | U | | 6/2019 |
| CN | 210241668 | U | * | 4/2020 |
| CN | 210463126 | U | | 5/2020 |
| JP | 2005273983 | A | | 10/2005 |
| JP | 2013002808 | A | | 1/2013 |
| JP | 2016169940 | A | | 9/2016 |

* cited by examiner

COMBINATION MICROWAVE AND HOOD SYSTEM

CROSS-REFERENCES TO RELATED APPLICATIONS

The present application claims benefit of Chinese Application No. 202110225393.6 and No. 202110224537.6, both filed on Mar. 1, 2021, the contents of which are hereby incorporated by reference in its entirety.

FIELD

The present application relates to the field of household appliances; in particular, the present application relates to a cooking device.

BACKGROUND

This section provides only background information related to the present disclosure, which is not necessarily the prior art.

Cooking devices such as OTR (over the range) cooking devices are usually suspended above the stove. The cooking device uses its own fume suction function to suction fume generated during the cooking process of the stove, and the cooking device uses its own microwave heating function to heat food in a cooking cavity.

The cooking device includes an air duct system, which includes a heat dissipation air duct and an fume air duct. When the cooking device is working, the air duct system has high wind noise and poor smoothness of airflow, which reduces the user experience.

SUMMARY

An object of the present application is to at least solve the problem of how to reduce wind noise and improve the smoothness of airflow.

The present application proposes a cooking device, which includes:
- an inner chamber, which is provided with a cooking cavity;
- an outer cover, the outer cover being arranged outside the inner chamber, and a heat dissipation air duct and a fume air duct being formed between the outer cover and the inner chamber; in which at least part of the heat dissipation air duct is located on a side of the inner chamber, a first air inlet of the heat dissipation air duct is provided on the outer cover and arranged corresponding to the side of the inner chamber, the heat dissipation air duct communicates with the cooking cavity and the fume air duct respectively, and a set of power devices of the cooking device are placed in the heat dissipation air duct; and
- an air suction assembly including a first air suction member and a second air suction member, the first air suction member being arranged in the heat dissipation air duct, and the second air suction member being arranged in the fume air duct and located at a rear of the inner chamber.

According to the cooking device of the present application, the outer cover is arranged outside the inner chamber, and a space between the outer cover and the inner chamber forms a heat dissipation air duct and an fume air duct; the heat dissipation air duct communicates with the cooking cavity and the fume air duct respectively, the set of power devices and the first air suction member are both arranged in the heat dissipation air duct, and the second air suction member is arranged in the fume air duct. When the cooking device is in use (the cooking function and the fume suction function are used at the same time), both the first air suction member and the second air suction member are activated. Under the action of the first air suction member, air enters the heat dissipation air duct, and the air entering the heat dissipation air duct dissipates heat from the set of power devices through heat exchange. A part of the air after heat exchange enters the cooking cavity and then is discharged, and the other part of the air enters the fume air duct and then is discharged. By communicating the heat dissipation air duct with the cooking cavity and the fume air duct, obstruction to the air during the flow in the heat dissipation air duct can be reduced, so that the smoothness of air flow is improved. In addition, since the heat dissipation air duct communicates with the fume air duct, a flow rate of the air can be effectively increased under a joint action of the first air suction member and the second air suction member, so that a heat dissipation effect on the set of power devices is ensured.

In addition, the cooking device according to the present application may also have the following additional features.

In some embodiments of the present application, at least part of the set of power devices is located on a side of the inner chamber.

In some embodiments of the present application, the cooking device further includes a partition assembly arranged between the outer cover and the inner chamber, and the partition assembly divides the side of the inner chamber at least into a first electrical room and a second electrical room; the first air inlet communicates with the first electrical room, the first electrical room communicates with the cooking cavity, the second electrical room and the fume air duct respectively, and the second electrical room communicates with the fume air duct.

In some embodiments of the present application, the second electrical room is located at a rear of the first electrical room.

In some embodiments of the present application, the partition assembly includes:
- a first partition, which is located on the side of the inner chamber, and which is provided with a first through hole communicating with the first air inlet; and
- a second partition, which is located on the side of the inner chamber and connected with the first partition; in which the second partition, the first partition, the first outer cover and the side of the inner chamber together enclose the first electrical room, the second partition is provided with a second through hole and a third through hole, the first electrical room communicates with the second electrical room through the second through hole, and the first electrical room communicates with the fume air duct through the third through hole.

In some embodiments of the present application, the partition assembly further includes a third partition arranged at the rear of the inner chamber; the third partition, the inner chamber and the outer cover together enclose the second electrical room, the third partition is provided with a fourth through hole, and the second electrical room communicates with the fume air duct through the fourth through hole.

In some embodiments of the present application, the cooking device further includes a support plate with a second air inlet, and the support plate is arranged at the rear of the inner chamber; the support plate, the inner chamber, the third partition and the outer cover together enclose a first air duct portion of the fume air duct; the second air suction member is arranged in the first air duct portion and communicates with the outside through the second air inlet; and the first air duct portion communicates with the first electrical room and the second electrical room respectively.

In some embodiments of the present application, the cooking device further includes a first air guide member; the first air guide member is arranged at the rear of the inner chamber, and the first air guide member and the second air suction member are respectively located on two opposite sides of the third partition; the first air guide member, the inner chamber, the third partition and the outer cover together enclose a second air duct portion of the fume air duct, and the first air duct portion communicates with the second air duct portion through the fourth through hole of the third partition.

In some embodiments of the present application, the cooking device further includes a second air guide member, which is arranged at a top of the inner chamber; the inner chamber, the second air guide member and the outer cover together enclose a third air duct portion of the fume air duct, the third air duct portion communicates with the second air duct portion, and the outer cover is provided with a first air outlet that communicates with the third air duct portion.

In some embodiments of the present application, the inner chamber is provided with an air intake hole and an air exhaust hole that communicate with the cooking cavity respectively, the cooking cavity communicates with the first electrical room through the air intake hole, and the cooking cavity communicates with the outside through the air exhaust hole.

In some embodiments of the present application, the cooking device further includes a third air guide member which is arranged between the inner chamber and the outer cover, and the air exhaust hole communicates with a second air outlet on the outer cover through the third air guide member.

In some embodiments of the present application, the first partition and the outer cover together enclose a third electrical room; the first electrical room, the second electrical room and the third electrical room communicate with each other in sequence, and a plurality of power devices of the set of power devices are dispersedly placed in the first electrical room, the second electrical room and the third electrical room.

In some embodiments of the present application, a third air outlet is provided on the outer cover, and the third electrical room communicates with the outside through the third air outlet.

BRIEF DESCRIPTION OF THE DRAWINGS

The drawings are only used for the purpose of illustrating the embodiments, and should not be considered as a limitation to the present application. Moreover, throughout the drawings, identical components are denoted by identical reference signs. In the drawings.

LIST OF REFERENCE SIGNS

Figure 1:
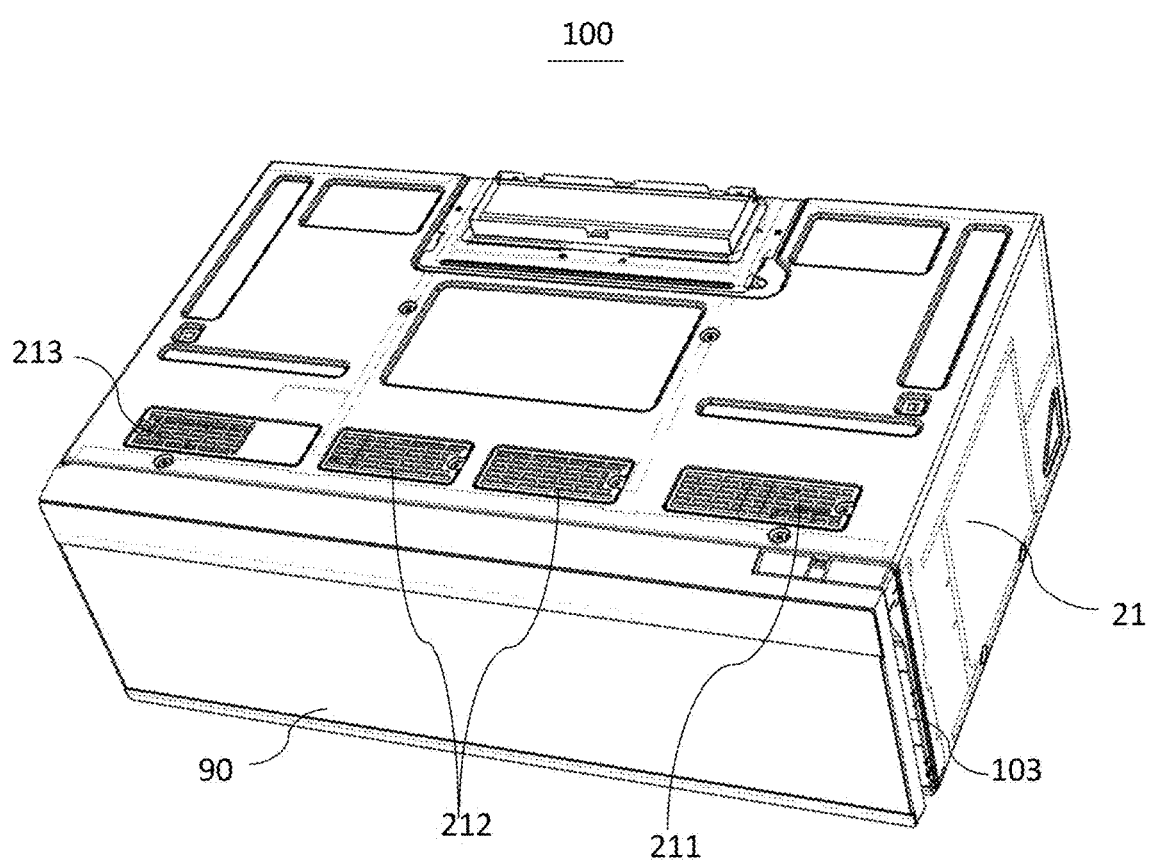
FIG. 1 schematically shows a structural view of a cooking device according to an embodiment of the present application.

100: cooking device;
10: inner chamber; 11: cooking cavity; 12: air intake hole; 13: air exhaust hole;
20: outer cover; 21: side plate; 211: first air inlet; 212: first air outlet; 213: second air outlet; 22: rear plate;
30: partition assembly; 31: first partition; 311: first through hole; 32: second partition; 321: second through hole; 322: third through hole; 33: third partition; 331: fourth through hole;
40: suction assembly; 41: first air suction member; 42: second air suction member;
50: support plate; 51: second air inlet;
60: first air guide member;
70: second air guide member;
80: third air guide member;
90: door assembly;
101: heat dissipation air duct; 1011: first electrical room; 1012: second electrical room; 1013: third electrical room;
102: fume air duct; 1021: first air duct portion; 1022: second air duct portion; 1023: third air duct portion;
103: control panel;
104: a set of power devices.

DETAILED DESCRIPTION OF THE DISCLOSURE

Hereinafter, exemplary embodiments of the present disclosure will be described in more detail with reference to the accompanying drawings. Although the exemplary embodiments of the present disclosure are shown in the drawings, it should be understood that the present disclosure may be implemented in various forms and should not be limited by the embodiments set forth herein.

It should be understood that the terms used herein are only for the purpose of describing specific exemplary embodiments, and are not intended to be limitative. Unless clearly indicated otherwise in the context, singular forms "a", "an", and "said" as used herein may also mean that plural forms are included. Terms "include", "comprise", "contain" and "have" are inclusive and therefore indicate the existence of the stated features, steps, operations, elements and/or components, but do not exclude the existence or addition of one or more other features, steps, operations, elements, components, and/or combinations thereof. The method steps, processes, and operations described herein should not be interpreted as requiring them to be executed in the specific order described or illustrated, unless the order of execution is clearly indicated. It should also be understood that additional or alternative steps may be used.

Although terms "first", "second", "third" and the like may be used herein to describe multiple elements, components, regions, layers and/or sections, these elements, components, regions, layers and/or sections should not be limited by these terms. These terms may only be used to distinguish one element, component, region, layer or section from another region, layer or section. Unless clearly indicated in the context, terms such as "first", "second" and other numerical terms do not imply an order or sequence when they are used herein. Therefore, the first element, component, region, layer or section discussed below may be referred to as a second element, component, region, layer or section without departing from the teachings of the exemplary embodiments.

For ease of description, spatial relative terms may be used herein to describe the relationship of one element or feature relative to another element or feature as shown in the drawings. These relative terms are, for example, "inner", "outer", "inside", "outside", "below", "under", "above", "over", etc. These spatial relative terms are intended to include different orientations of the device in use or operation in addition to the orientation depicted in the drawings. For example, if the device in the figure is turned over, then elements described as "below other elements or features" or "under other elements or features" will be oriented as "above the other elements or features" or "over the other elements or features". Thus, the exemplary term "below" may include orientations of both above and below. The device can be otherwise oriented (rotated by 90 degrees or in other directions), and the spatial relationship descriptors used herein will be explained accordingly.

As shown in FIGS. 1 to 5, according to an embodiment of the present application, a cooking device 100 is proposed. The cooking device 100 includes an inner chamber 10, an outer cover 20, and a suction assembly 40. The inner chamber 10 is provided with a cooking cavity 11, the outer cover 20 is arranged outside the inner chamber 10, and a heat dissipation air duct 101 and a fume air duct 102 are formed between the outer cover 20 and the inner chamber 10. At least part of the heat dissipation air duct 101 is located on a side of the inner chamber 10, a first air inlet 211 of the heat dissipation air duct 101 is provided on the outer cover 20 and arranged corresponding to the side of the inner chamber 10, the heat dissipation air duct 101 communicates with the cooking cavity 11 and the fume air duct 102 respectively, and a set of power devices 104 of the cooking device 100 are placed in the heat dissipation air duct 101. The air suction assembly 40 includes a first air suction member 41 and a second air suction member 42, the first air suction member 41 is arranged in the heat dissipation air duct 101, and the second air suction member 42 is arranged in the fume air duct 102 and located at a rear of the inner chamber 10.

Specifically, the outer cover 20 is arranged outside the inner chamber 10, and a space between the outer cover 20 and the inner chamber 10 forms the heat dissipation air duct 101 and the fume air duct 102. The heat dissipation air duct 101 communicates with the cooking cavity 11 and the fume air duct 102 respectively, the set of power devices 104 and the first air suction member 41 are both arranged in the heat dissipation air duct 101, and the second air suction member 42 is arranged in the fume air duct 102. When the cooking device 100 is in use (the cooking function and the fume suction function are used at the same time), both the first air suction member 41 and the second air suction member 42 are activated. Under the action of the first air suction member 41, air enters the heat dissipation air duct 101, and the air entering the heat dissipation air duct 101 dissipates heat from the set of power devices 104 through heat exchange. A part of the air after heat exchange enters the cooking cavity 11 and then is discharged, and the other part of the air enters the fume air duct and then is discharged. By communicating the heat dissipation air duct 101 with the cooking cavity 11 and the fume air duct, obstruction to the air during the flow in the heat dissipation air duct 101 can be reduced, so that the smoothness of air flow is improved. In addition, since the heat dissipation air duct communicates with the fume air duct, a flow rate of the air can be effectively increased under a joint action of the first air suction member 41 and the second air suction member 42, so that a heat dissipation effect on the set of power devices 104 is ensured.

It should be understood that at least part of the heat dissipation air duct 101 is arranged on the side of the inner chamber 10; at this time, at least part of the set of power devices 104 can be arranged in the air duct of the heat dissipation air duct 101 that is located on the side of the inner chamber 10, and at the same time, the arrangement of the second air suction member 42 at the rear of the inner chamber 10 can prevent a top space of the inner chamber 10 from being occupied, and achieving the purpose of reducing the height of the cooking device 100 and meeting user's installation requirements in a small space.

It should be pointed out that in the present application, the cooking device 100 is provided with a pick-and-place port, which communicates with the cooking cavity 11 of the inner chamber 10. After installation of the cooking device 100 is completed, when the user faces the pick-and-place port, a side of the inner chamber 10 that is close to the user is a front of the inner chamber 10, a side of the inner chamber 10 that is away from the user is a rear of the inner chamber 10, a side of the inner chamber 10 that is located on the user's left hand is a left side, and a side of the inner chamber 10 that is located on the user's right hand is a right side. The left and right sides are collectively referred to as the sides of the inner chamber 10. A side of the inner chamber 10 that is away from the stove is a top of the inner chamber 10, and a side of the inner chamber 10 that is close to the stove is a bottom of the inner chamber 10. A distance from the left side to the right side of the cooking device 100 is a length of the cooking device 100, a distance from the top to the bottom of the cooking device 100 is a height of the cooking device 100, and a distance from the front to the rear of the cooking device 100 is a width of the cooking device 100.

Figure 2:
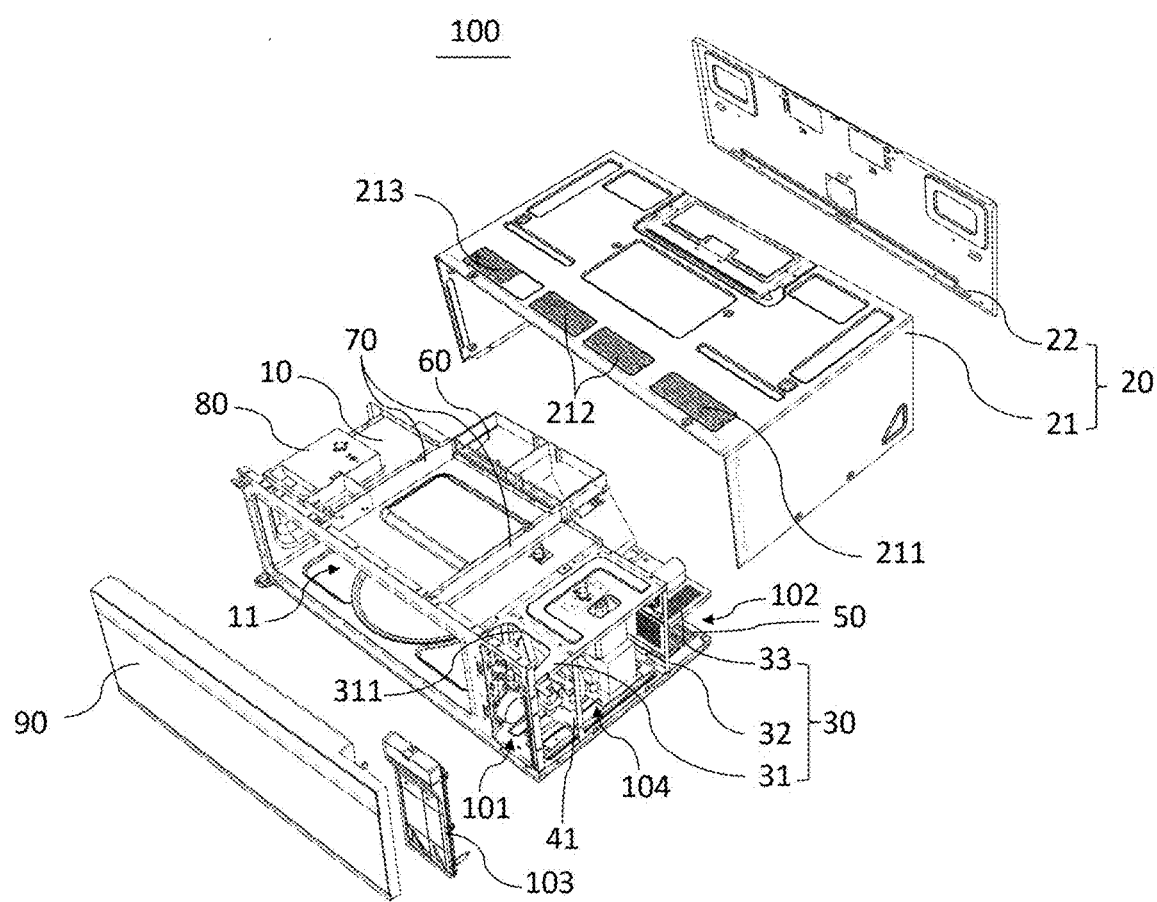
FIG. 2 is a schematic exploded structural view of the cooking device shown in FIG. 1.

In addition, as shown in FIGS. 1 and 2, the cooking device 100 further includes a door assembly 90 and a control panel 103. The door assembly 90 is pivotally fitted with a front plate of the inner chamber 10, and the door assembly 90 is opened or closed so that opening or closing of the pick-and-place port is realized; the control panel 103 is also provided on the front plate of the inner chamber 10, and the user can control the cooking device 100 by manipulating the control panel 103.

In addition, as shown in FIGS. 1 and 2, the outer cover 20 includes a side plate 21 and a rear plate 22. The side plate 21 is arranged on the left side, the top, and the right side of the inner chamber 10, and is connected and fixed to the front plate and a bottom plate of the inner chamber 10 through fasteners such as screws; the rear plate 22 is arranged at the rear of the inner chamber 10, and is connected and fixed to the bottom plate and the side plate 21 of the inner chamber 10 through fasteners such as screws. By dividing the outer cover 20 into two parts, i.e., the side plate 21 and the rear plate 22, when the cooking device 100 needs to be repaired, it is only required to remove the side plate 21 or the rear plate 22, and improving the maintenance efficiency of the cooking device 100. Moreover, by dividing the outer cover 20 into the two parts of the side plate 21 and the rear plate 22, processing and manufacturing are facilitated, and the manufacturing cost of the cooking device 100 can be effectively reduced.

It is further understood that at least part of the set of power devices 104 is located on the side of the inner chamber 10. By arranging at least part of the set of power devices 104 on the side of the inner chamber 10, the set of power devices 104 is further prevented from occupying the top space of the inner chamber 10, so that the height of the cooking device 100 is reduced, and meeting user's installation requirements in a small space.

Figure 3:
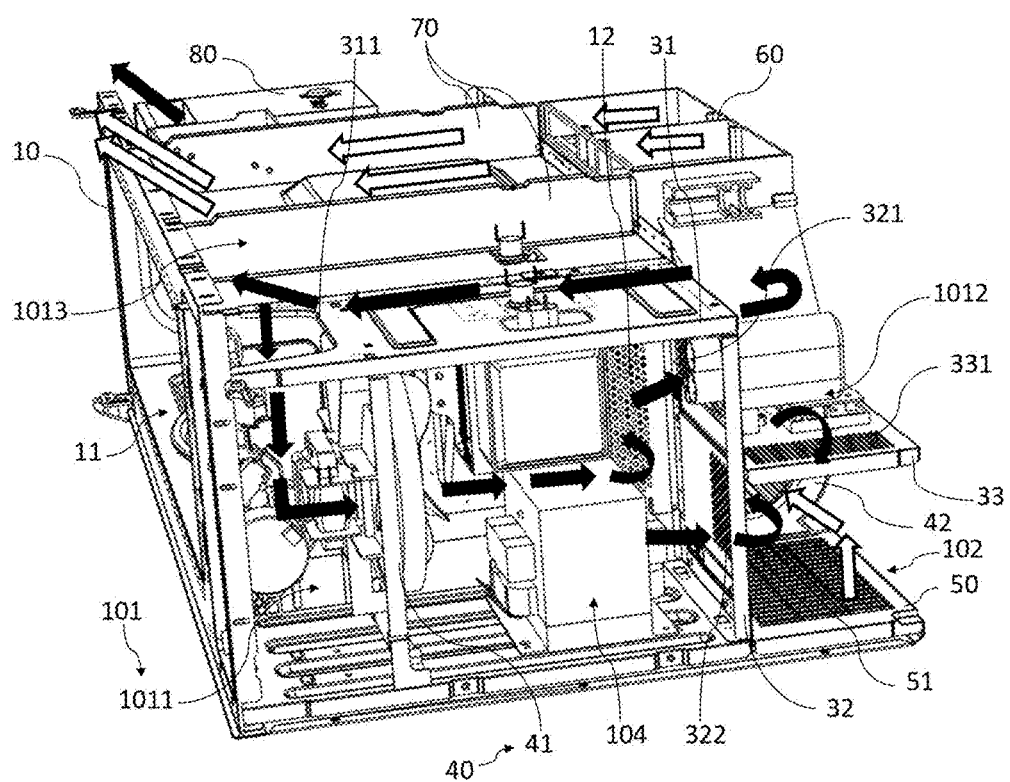
FIG. 3 is a schematic structural view of a first embodiment of the cooking device shown in FIG. 2 when in a first posture (partial structure is shown, in which black solid arrows indicate an air flow direction of a heat dissipation air duct, and black hollow arrows indicate an air flow direction of a fume air duct)
Figure 4:
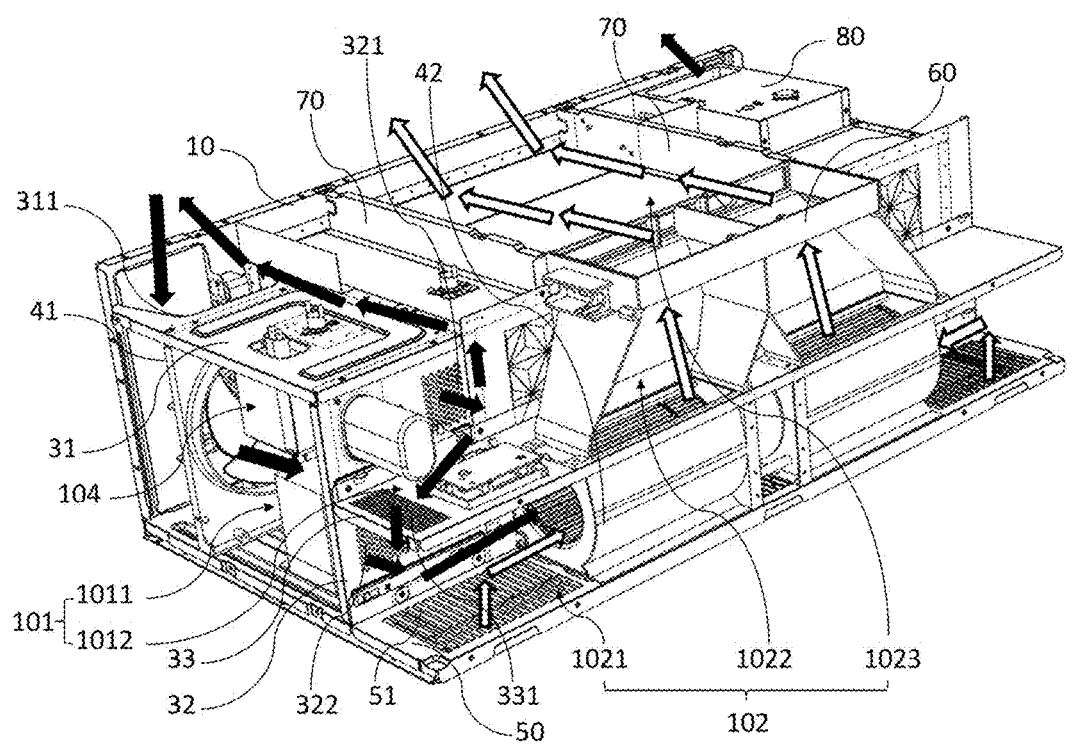
FIG. 4 is a schematic structural view of the cooking device shown in FIG. 2 in a second posture (partial structure is shown, in which black solid arrows indicate the air flow direction of the heat dissipation air duct, and black hollow arrows indicate the air flow direction of the fume air duct)

Further, as shown in FIGS. 2 to 4, the cooking device 100 further includes a partition assembly 30 arranged between the outer cover 20 and the inner chamber 10, and the partition assembly 30 divides the side of the inner chamber 10 at least into a first electrical room 1011 and a second electrical room 1012. The first air inlet 211 communicates with the first electrical room 1011. The first electrical room 1011 communicates with the cooking cavity 11, the second electrical room 1012 and the fume air duct 102 respectively. The second electrical room 1012 communicates with the fume air duct 102. Specifically, the partition assembly 30 divides the side (the left side or the right side) of the inner chamber 10 into the first electrical room 1011 and the second electrical room 1012. The first electrical room 1011 communicates with the second electrical room 102, the cooking cavity 11 and the fume air duct 102 respectively. When the cooking device 100 is activated, the first air suction member 41 and the second air suction member 42 are activated, so that the outside air enters the first electrical room 1011 through the first air inlet 211, and the air entering the first electrical room 1011 exchanges heat with the power devices of the set of power devices 104 in the first electrical room 1011 to lower the temperature of the power devices; the air passing through the first electrical room 1011 enters the cooking cavity 11, the second electrical room 1012, and the fume air duct 102, respectively. The air entering the cooking cavity 11 from the first electrical room 1011 is discharged through an exhaust structure of the cooking cavity 11. The air entering the second electrical room 1012 from the first electrical room 1011 exchanges heat with the power devices located in the second electrical room 1012, and the air after the heat exchange enters the fume air duct 102. The air entering the fume air duct 102 from the second electrical room 1012 is discharged through the fume air duct 102, and the air entering the fume air duct 102 from the first electrical room 1011 is also discharged through the fume air duct 102.

By arranging multiple power devices of the set of power devices 104 in multiple electrical rooms respectively, the layout of the set of power devices 104 in the heat dissipation air duct 101 is made more reasonable, which reduces the obstruction to the air, and reducing wind noise in the air flow process and improving the smoothness in the air flow process.

Furthermore, as shown in FIGS. 2 to 4, the second electrical room 1012 is located at the rear of the first electrical room 1011. Specifically, the first electrical room 1011 is located on the side (the left side or the right side) of the inner chamber 10, and the second electrical room 1012 is arranged corresponding to the first electrical room 1011 and is located at the rear of the first electrical room 1011. Therefore, the length of the cooking device 100 is effectively reduced, and the structure of the cooking device 100 is made more compact, and reducing the space occupied by the cooking device 100 during the installation, and meeting user's installation requirements in a small space.

Further, as shown in FIGS. 2 to 4, the partition assembly 30 includes a first partition 31 and a second partition 32. The first partition 31 is located on the side of the inner chamber 10, and the first partition 31 is provided with a first through hole 311 communicating with the first air inlet 211. The second partition 32 is located on the side of the inner chamber 10 and is connected to the first partition 31; the second partition 32, the first partition 31, the first outer cover 20 and the side of the inner chamber 10 together enclose the first electrical room 1011. The second partition 32 is provided with a second through hole 321 and a third through hole 322, the first electrical room 1011 communicates with the second electrical room 1012 through the second through hole 321, and the first electrical room 1011 communicates with the fume air duct 102 through the third through hole 322. Specifically, the first partition 31 is provided on the side of the inner chamber 10 and extends in a width direction of the cooking device 100, and the second partition 32 is provided on the side of the inner chamber 10 and extends in a height direction of the cooking device 100. The second partition 32 is connected perpendicularly to the first partition 31, and the first electrical room 1011 formed by being enclosed by the second partition 32, the first partition 31, the first outer cover 20 and the side of the inner chamber 10 altogether is a part of the heat dissipation air duct 101, so that the overall structure a simple and the manufacturing cost is low. In addition, the communication between the first electrical room 1011 and the outside is achieved through the first through hole 311 on the first partition 31, and the communication between the first electrical room 1011 and the fume air duct 102 is achieved through the second through hole 321 and the third through hole 322 on the second partition 32, which is simple in structure and facilitates processing and manufacturing.

It should be pointed out that as shown in FIGS. 2 to 4, the first electrical room 1011 is located on the side of the inner chamber 10, the first partition 31 and the second partition 32 are both flat plates, and the first partition 31 and the second partition 32 are arranged perpendicular to each other; the direction of the second through hole 321 is consistent with the direction of the third through hole 322, and the direction of the first through hole 311 is perpendicular to the direction of the second through hole 321 and the direction of the third through hole 322 respectively. When the air enters the first electrical room 1011 through the first through hole 311, it flows in a direction toward the second partition 32 under the action of the first air suction member 41; by providing the second through hole 321 and the third through hole 322 on the second partition 32, when the air reaches the second partition 32, it can directly enter the second electrical room 1012 through the second through hole 321, and directly enter the fume air duct 102 through the third through hole 322, which reduces the impact of the second partition 32 on the air, so that the smoothness of the air is improved, and the wind noise in the air flow process is also reduced.

In addition, the first through hole 311 is provided at a position far away from the second partition 32, which can increase the path of air in the first electrical room 1011, so that heat of the various power devices of the set of power devices 104 located in the first electrical room 1011 can be sufficiently dissipated, and it is further ensured that the set of power devices 104 operate stably and efficiently.

In addition, as shown in FIGS. 2 to 4, the second through hole 321 is of a first mesh structure, and the third through hole 322 is of a second mesh structure. By setting the second through hole 321 as the first mesh and setting the third through hole 322 as the second mesh, the smoothness of the air flow is improved, and the wind noise in the air flow process is reduced.

Further, as shown in FIGS. 2 to 4, the partition assembly 30 further includes a third partition 33, the third partition 33 is arranged at the rear of the inner chamber 10, and the third partition 33, the inner chamber 10 and the outer cover 20 together enclose the second electrical room 1012; the third partition 33 is provided with a fourth through hole 331, and the second electrical room 1012 communicates with the fume air duct 102 through the fourth through hole 331. Specifically, the third partition 33 is arranged at the rear of the inner chamber 10 and extends in a length direction of the cooking device 100, and one end of the third partition 33 protrudes out of the side of the inner chamber 10; the part of the third partition 33 that protrudes out of the inner chamber 10 is connected perpendicularly to the second partition 32, and encloses the second electrical room 1012 together with the inner chamber 10 and the outer cover 20. The second electrical room 1012 communicates with the fume air duct 102 through the fourth through hole 331. The formation of the second electrical room 1012 is simple in structure, which facilitates processing and manufacturing, and can effectively reduce the manufacturing cost of the cooking device 100.

It should be pointed out that the second through hole 321 on the second partition 32 communicates with the second electrical room 1012, the third through hole 322 on the third partition 33 communicates with the fume air duct 102, and the direction of the second through hole 321 is perpendicular to the direction of the third through hole 322. The air in the first electrical room 1011 enters the second electrical room 1012 through the second through hole 321, and then enters the fume air duct 102 through the third through hole 322. Through the arrangement of the second through hole 321 and the third through hole 322, the smoothness of the air flow can be further improved, and the wind noise in the air flow process is effectively reduced.

In addition, the third partition 33 is a plate-shaped member, and the third partition 33, which is a plate-shaped member, has a simple structure, which facilitates processing and manufacturing, and leads to a low manufacturing cost.

Further, as shown in FIGS. 2 to 4, the cooking device 100 further includes a support plate 50 having a second air inlet 51, the support plate 50 is arranged at the rear of the inner chamber 10, and the support plate 50, the inner chamber 10, the third partition 33 and the outer cover 20 together enclose a first air duct portion 1021 of the fume air duct 102. The second air suction member 42 is arranged in the first air duct portion 1021 and communicates with the outside through the second air inlet 51. The first air duct portion 1021 communicates with the first electrical room 1011 and the second electrical room 1012, respectively. Specifically, the outer cover 20 is arranged outside the inner chamber 10, and the third partition 33 and the support plate 50 are both arranged between the outer cover 20 and the inner chamber 10. The third partition 33 is arranged at the rear of the inner chamber 10 and extends in the length direction of the cooking device 100. The support plate 50 is also arranged at the rear of the inner chamber 10, and the support plate 50 is arranged under the third partition 33 in a parallel and spaced-apart manner. The second air suction member 42 is arranged on the support plate 50 and located between the support plate 50 and the third partition 33. The third partition 33, the support plate 50, the inner chamber 10 and the outer cover 20 together enclose the first air duct portion 1021 of the fume air duct 102, and the first air duct portion 1021 communicates with the outside through the second air inlet 51 on the support plate 50. When it is necessary to suction fume from the stove below the cooking device 100, the second air suction member 42 is activated. Under the action of the first air suction member 41, the fume enters the first air duct portion 1021 through the second air inlet 51 and enters a fume exhaust duct along the fume air duct 102 to realize the discharging of fume. By arranging the second air suction member 42 in the first air duct portion 1021, the height of the cooking device 100 can be effectively reduced while ensuring normal suctioning of fume, and reducing the space required for installing the cooking device 100 and meeting user's installation requirements in a small space.

It should be pointed out that in the present application, the support plate 50 is flush with the bottom plate of the inner chamber 10, and the third partition 33 is arranged above the support plate 50 in a spaced-apart manner. The third partition 33, the support plate 50, the inner chamber 10 and the outer cover 20 together enclose the first air duct portion 1021 of the fume air duct 102, and the first air duct portion 1021 is located below the rear of the inner chamber 10, which further prevents the second air suction member 42 from occupying the top space of the inner chamber 10, so that the height of the cooking device 100 can be reduced to meet user's installation requirements in a small space.

In addition, as shown in FIGS. 3 and 4, in the present application, the second air suction member 42 is a vortex fan, the second air inlet 51 on the support plate 50 is a first grille structure, and the second air inlet 51 is arranged close to an inlet of the vortex fan to ensure the suctioning effect of the vortex fan on the fume, so that the discharging effect of the fume is guaranteed.

In addition, as shown in FIG. 4, the number of the second air suction members 42 may be plural, and the plurality of second air suction members 42 are arranged at intervals in the first air duct portion 1021. By providing the plurality of second air suction members 42, the ability of the cooking device 100 to suction fume is improved, and the effect of the cooking device 100 on discharging the fume is further improved.

Further, as shown in FIGS. 2 to 4, the cooking device 100 further includes a first air guide member 60, the first air guide member 60 is arranged at the rear of the inner chamber 10, and the first air guide member 60 and the second air suction member 42 are respectively located on opposite sides of the third partition 33. The first air guide member 60, the inner chamber 10, the third partition 33 and the outer cover 20 together enclose a second air duct portion 1022 of the fume air duct 102. The first air duct portion 1021 communicates with the second air duct portion 1022 through the fourth through hole 331 of the third partition 33. Specifically, the first air guide member 60 is arranged at the rear of the inner chamber 10, and the first air guide member 60 and the second air suction member 42 are located on both sides of the third partition 33. The first air guide member 60, the third partition 33, the inner chamber 10 and the outer cover 20 together enclose the second air duct portion 1022 of the fume air duct 102. The first air duct portion 1021 communicates with the second air duct portion 1022 through the fourth through hole 331 of the third partition 33. When it is necessary to suction fume from the stove below the cooking device 100, the second air suction member 42 is activated. Under the action of the second air suction member 42, the fume enters the first air duct portion 1021 through the second air inlet 51, then enters the second air duct portion 1022 through the fourth through hole 331, and finally enter the fume exhaust duct along the fume air duct 102 to realize the discharging of fume. By providing the second air duct portion 1022, a guidance to the fume is realized, so that the fume is discharged according to a preset path, and ensuring the discharging effect of the fume.

It should be pointed out that as shown in FIG. 4, the first air guide member 60 is a first air guide plate, and the first air guide plate has a simple structure, and is easy to process and manufacture, which can effectively ensure the manufacturing cost of the first air guide member 60. In addition, the first air guide plate is arranged obliquely and at an angle to the flow direction of the air flow, and ensuring a better guidance to the air, and further improving the smoothness of the air flow.

In addition, as shown in FIG. 4, when the number of the second air suction members 42 is plural, the number of the fourth through holes 331 on the third partition 33 and the number of the first air guide members 60 each have a one-to-one correspondence to the number of the second air suction members. That is, each second air suction member 42 corresponds to one fourth through hole 331 and one first air guide member 60, to ensure the effective guidance to the fume, further improving the effect of discharging the fume.

Further, as shown in FIGS. 2 to 4, the cooking device 100 further includes a second air guide member 70, the second air guide member 70 is arranged at the top of the inner chamber 10, and the inner chamber 10, the second air guide member 70 and the outer cover 20 together enclose a third air duct portion 1023 of the fume air duct 102; the third air duct portion 1023 communicates with the second air duct portion 1022, and the outer cover 20 is provided with a first air outlet 212 communicating with the third air duct portion 1023. Specifically, the third air duct portion 1023 is located at the top of the inner chamber 10, and the third air duct portion 1023, the second air duct portion 1022 and the first air duct portion 1021 communicate with each other in sequence to form the fume air duct 102; the fume air duct 102 covers the rear and the top of the inner chamber 10, and the third air duct portion 1023 formed by the second air guide member 70, the inner chamber 10 and the outer cover 20 is arranged at the top of the inner chamber 10; by controlling the height of the second air guide member 70, the height of the cooking device 100 can be effectively reduced while ensuring the discharging of the fume, so that user's installation requirements in a small space can be met.

It should be pointed out that the second air guide member 70 is a second air guide plate, and the number of the second air guide plates is two; the two second air guide plates are arranged at the top of the inner chamber 10 in a parallel and spaced-apart manner, a space between the two second air guide plates constitutes the third air duct portion 1023, and the first air outlet on the outer cover 20 communicates with the third air duct portion 1023 and is located away from the second air duct portion 1022.

In other embodiments, an outlet of the second air duct portion 1022 directly communicates with the fume exhaust duct, and there is no need to provide the second air guide member 70, so that the manufacturing cost of the cooking device 100 is further reduced, and at the same time, the height of the cooking device 100 can be further reduced.

Figure 5:
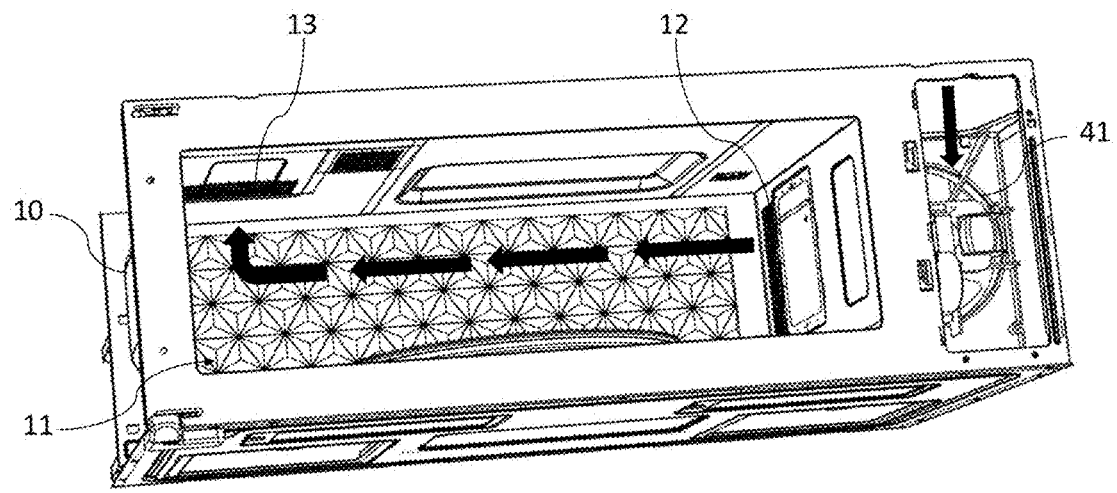
FIG. 5 is a schematic structural view of the cooking device shown in FIG. 2 in a third posture (partial structure is shown, in which black solid arrows indicate the air flow direction of the heat dissipation air duct, and black hollow arrows indicate the air flow direction of the fume air duct)

Further, as shown in FIGS. 4 and 5, the inner chamber 10 is provided with an air intake hole 12 and an air exhaust hole 13 communicating with the cooking cavity 11 respectively, the cooking cavity 11 communicates with the first electrical room 1011 through the air intake hole 12, and the cooking cavity 11 communicates with the outside through the air exhaust hole 13. Specifically, the cooking cavity 11 communicates with the first electrical room 1011 through the air intake hole 12, and communicates with the outside through the air exhaust hole 13. The air in the first electrical room 1011 enters the cooking cavity 11 through the air intake hole 12 and then takes water vapor or fume or the like in the cooking cavity 11 away from the cooking cavity 11 through the air exhaust hole 13, and ensuring a good cooking environment in the cooking cavity 11 and improving the cooking quality of food.

It should be pointed out that the air intake hole 12 is provided on a side wall of the cooking cavity 11 that corresponds to the first electrical room 1011, and the air exhaust hole 13 is provided on the top wall of the cooking cavity 11 and is located away from the air intake hole 12. The arrangement of the air intake hole 12 and the air exhaust hole 13 can effectively ensure the effect of discharging water vapor or fume or the like in the cooking cavity 11.

In some embodiments of the present application, as shown in FIGS. 2 to 4, the cooking device 100 further includes a third air guide member 80. The third air guide member 80 is arranged between the inner chamber 10 and the outer cover 20, and the air exhaust hole 13 communicates with a second air outlet 213 on the outer cover 20 through the third air guide member 80. Specifically, the third air guide member 80 communicates the air exhaust hole 13 with the second air outlet 213 on the outer cover 20 to prevent water vapor or fume or the like from reaching between the inner chamber 10 and the outer cover 20, and ensuring the effect of discharging water vapor or fume or the like in the cooking cavity 11 and improving the sanitary conditions in the cooking cavity 11.

Further, as shown in FIGS. 3 and 4, the first partition 31 and the outer cover 20 together enclose a third electrical room 1013. The first electrical room, 1011, the second electrical room 1012 and the third electrical room 1013 communicate with each other in sequence, and a plurality of power devices of the set of power devices 104 are dispersedly placed in the first electrical room 1011, the second electrical room 1012 and the third electrical room 1013.

Specifically, the partition assembly 30 includes the first partition 33, the second partition 31, and the third partition 32. The third partition 33 is arranged at the rear of the inner chamber 10 and extends in the length direction of the cooking device 100. One end of the third partition 33 protrudes out of the side of the inner chamber 10 (which may either be the left side or the right side), the first partition 31 and the second partition 32 are both arranged on the side of the inner chamber 10, and the part of the third partition 33 that protrudes out of the side of the inner chamber 10 defines the first electrical room 1011, the second electrical room 1012 and the third electrical room 1013 by division. The plurality of power devices of the set of power devices 104 may be dispersedly placed in these three electrical rooms, and reducing the space occupied by the installation of the set of power devices 104, thus making the structure of the cooking device 100 more compact, reducing the volume of the cooking device 100, and reducing the space required for installing the cooking device 100.

It should be pointed out that the first partition 31 extends in the width direction of the cooking device 100 and is arranged close to the top of the inner chamber 10, the second partition 32 extends in the height direction of the cooking device 100, in which one end of the second partition 32 abuts against the first partition 31 and the other end abuts against the bottom plate of the inner chamber 10, and one end of the third partition 33 that protrudes out of the side of the inner chamber 10 cooperates with the second partition 32 to form the first electrical room 1011, the second electrical room 1012 and the third electrical room 1013, in which the first electrical room 1011 and the third electrical room 1013 are arranged up and down, and the third electrical room 1013 is located at the rear of the first electrical room 1011 and the second electrical room 1012. The arrangement of the first electrical room 1011, the second electrical room 1012 and the third electrical room 1013 can further improve the compactness of the cooking device 100, so that the volume of the cooking device 100 is further reduced, and the space required for installing the cooking device 100 is further reduced.

Figure 6:
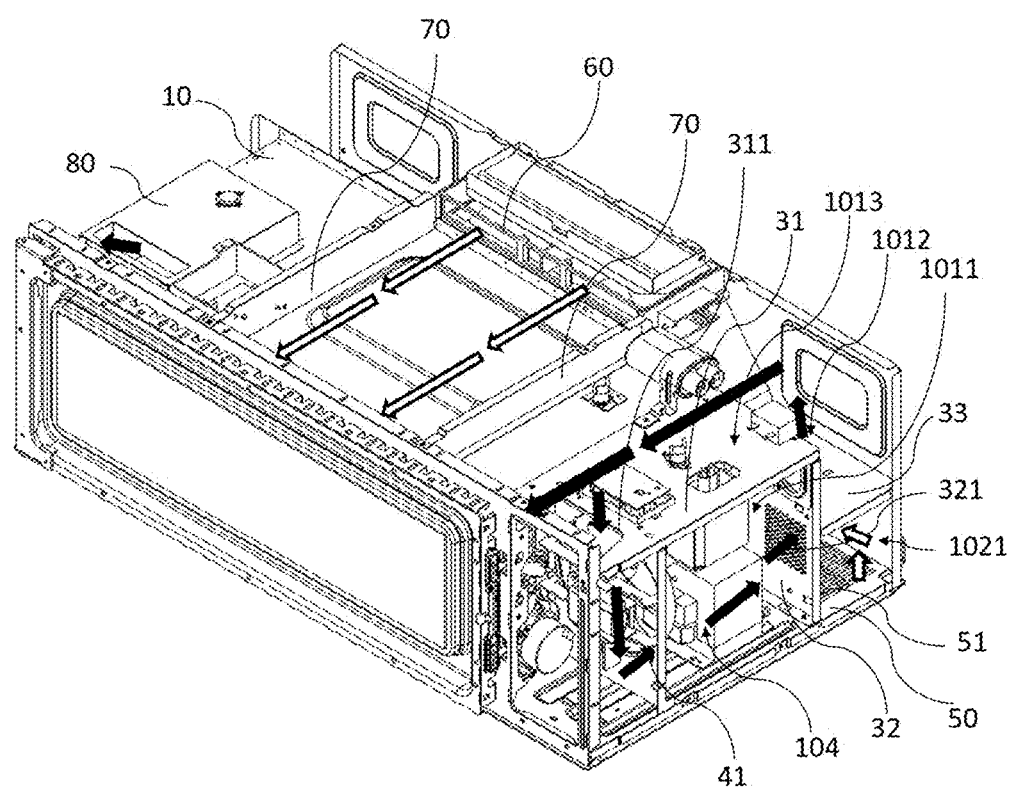
FIG. 6 is a schematic structural view of a second embodiment of the cooking device shown in FIG. 2 (partial structure is shown, and a set of power devices are distributed in a first electrical room, a second electrical room and a third electrical room, in which black solid arrows indicate the air flow direction of the heat dissipation air duct, and black hollow arrows indicate the air flow direction of the fume air duct).

In addition, as shown in FIG. 4 or FIG. 6, the set of power devices 104 typically includes: a magnetron, a transformer, a filter, and a capacitor. Power devices (such as the magnetron, the transformer, etc.) with a larger volume are arranged in the first electrical room 1011, power devices (such as the capacitor, etc.) with a medium volume may be placed in the second electrical room 1012, and power devices (such as the filter, etc.) with a small volume may be placed in the third electrical room 1013, and making the overall layout more reasonable, to achieve the purpose of further reducing the cooking device 100.

In addition, in other embodiments of the present application, as shown in FIG. 6, the third partition 33 is not provided with the fourth through hole 331, the second electrical room 1012 communicates with the first electrical room 1011 and the third electrical room 1013 respectively, and the first electrical room 1011, the second electrical room 1012 and the third electrical room 1013 constitute at least part of the heat dissipation air duct 101; the plurality of power devices of the set of power devices 104 are dispersedly placed in the first electrical room 1011, the second electrical room 1012 and the third electrical room 1013, and heat dissipation of the set of power devices 104 is realized through the operation of the first air suction member 41.

Further, a third air outlet is provided on the outer cover 20, and the third electrical room 1013 communicates with the outside through the third air outlet. Specifically, the third air outlet is arranged corresponding to the third electrical room 1013. When the second air suction member 42 in the cooking device 100 is not activated, under the action of the first air suction member 41, the outside air enter the first electrical room 1011 through the first air inlet 211 and the first through hole 311, then enters the second electrical room 1012 from the first electrical room 1011, and then enters the third electrical room 1013 from the second electrical room 1012; the air in the third electrical room 1013 is discharged through the third air outlet, and realizing effective heat dissipation of the set of power devices 104.

It should be pointed out that in the present application, the first air suction member 41 is a fan, and the fan has a simple structure and low manufacturing cost, which can effectively reduce the manufacturing cost of the cooking device.

In the present application, the above cooking device 100 is an OTR microwave oven. For the structure of other parts of the OTR microwave oven, reference may be made to the prior art, so a detailed description thereof will be omitted in the present application.

What is claimed is:

1. A cooking device of over the range (OTR) above a stove, comprising:
   an inner chamber, provided with a cooking cavity;
   an outer cover, the outer cover being arranged outside the inner chamber, and a heat dissipation air duct and a fume air duct being formed between the outer cover and the inner chamber; wherein at least part of the heat dissipation air duct is located on a side of the inner chamber, a first air inlet of the heat dissipation air duct is provided on the outer cover and arranged corresponding to the side of the inner chamber, the heat dissipation air duct communicates with the cooking cavity and the fume air duct respectively, and a set of power devices of the cooking device are placed in the heat dissipation air duct; and
   an air suction assembly comprising a first air suction fan and a second air suction fan, the first air suction fan being arranged in the heat dissipation air duct, and the second air suction fan being arranged in the fume air duct and located at a rear of the inner chamber;
   wherein the fume air duct is located at and above a bottom plate of the cooking device and configured to exhaust fume from the stove;
   wherein the cooking device further comprises a support plate, and the support plate is arranged at the rear of the inner chamber; the support plate, the inner chamber and the outer cover together enclose a first air duct portion of the fume air duct;
   wherein the cooking device further comprises a first air guiding plate; the first air guiding plate is arranged at the rear of the inner chamber; the first air guiding plate, the inner chamber and the outer cover together enclose a second air duct portion of the fume air duct, and the first air duct portion communicates with the second air duct portion;
   wherein the cooking device further comprises a second air guiding plate arranged at a top of the inner chamber; the inner chamber, the second air guiding plate and the outer cover together enclose a third air duct portion of the fume air duct, the third air duct portion communicates with the second air duct portion, and the outer cover is provided with a first air outlet that communicates with the third air duct portion.

2. The cooking device according to claim 1, wherein at least part of the set of power devices is located on the side of the inner chamber.

3. The cooking device according to claim 2, wherein the cooking device further comprises a partition assembly arranged between the outer cover and the inner chamber, and the partition assembly divides the side of the inner chamber at least into a first electrical room and a second electrical room; the first air inlet communicates with the first electrical room, the first electrical room communicates with the cooking cavity, the second electrical room and the fume air duct respectively, and the second electrical room communicates with the fume air duct.

4. The cooking device according to claim 3, wherein the second electrical room is located at a rear of the first electrical room.

5. The cooking device according to claim 3, wherein the partition assembly comprises:
   a first partition is located on the side of the inner chamber and provided with a first through hole communicating with the first air inlet; and
   a second partition is located on the side of the inner chamber and connected with the first partition;

wherein the second partition, the first partition, a first outer cover and the side of the inner chamber together enclose the first electrical room, the second partition is provided with a second through hole and a third through hole, the first electrical room communicates with the second electrical room through the second through hole, and the first electrical room communicates with the fume air duct through the third through hole.

6. The cooking device according to claim 5, wherein the partition assembly further comprises a third partition arranged at the rear of the inner chamber; the third partition, the inner chamber and the outer cover together enclose the second electrical room, the third partition is provided with a fourth through hole, and the second electrical room communicates with the fume air duct through the fourth through hole.

7. The cooking device according to claim 6, wherein the support plate is provided with a second air inlet; the support plate, the inner chamber, the third partition and the outer cover together enclose the first air duct portion of the fume air duct; the second air suction fan is arranged in the first air duct portion and communicates with the outside through the second air inlet; and the first air duct portion communicates with the first electrical room and the second electrical room respectively.

8. The cooking device according to claim 7, wherein the first air guiding plate and the second air suction fan are respectively located on two opposite sides of the third partition; the first air guiding plate, the inner chamber, the third partition and the outer cover together enclose the second air duct portion of the fume air duct, and the first air duct portion communicates with the second air duct portion through the fourth through hole of the third partition.

9. The cooking device according to claim 5, wherein the first partition and the outer cover together enclose a third electrical room; the first electrical room, the second electrical room and the third electrical room communicate with each other in sequence, and a plurality of power devices of the set of power devices are dispersedly placed in the first electrical room, the second electrical room and the third electrical room.

10. The cooking device according to claim 3, wherein the inner chamber is provided with an air intake hole and an air exhaust hole that communicate with the cooking cavity respectively, the cooking cavity communicates with the first electrical room through the air intake hole, and the cooking cavity communicates with outside through the air exhaust hole.

11. The cooking device according to claim 10, wherein the cooking device further comprises a third air guiding plate arranged between the inner chamber and the outer cover, and the air exhaust hole communicates with a second air outlet on the outer cover through the third air guiding plate.

* * * * *